Sept. 14, 1965     K. A. ANDERSON     3,206,034
FILTER
Filed Nov. 20, 1962     2 Sheets-Sheet 2
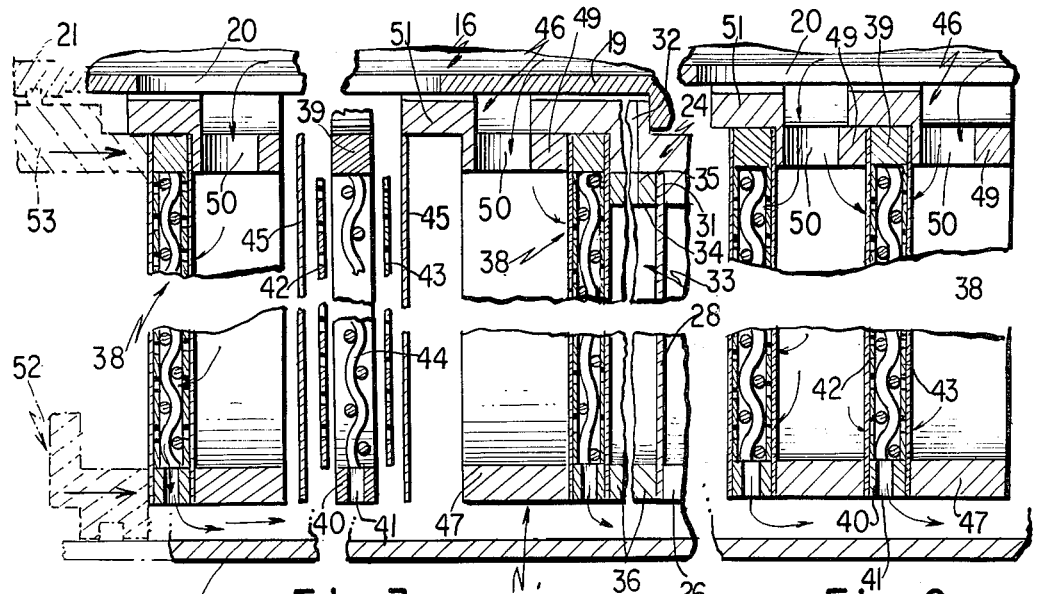
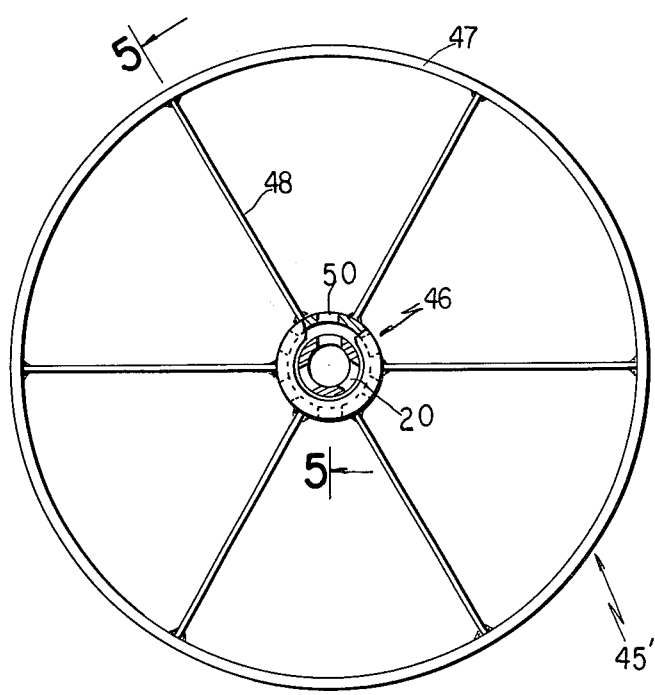
Fig. 4
Fig. 5
INVENTOR
KENNETH A. ANDERSON
BY
Robertson & Smythe
ATTORNEY United States Patent Office 3,206,034
Patented Sept. 14, 1965

3,206,034
FILTER
Kenneth A. Anderson, Silvis, Ill., assignor to Ametek, Inc., New York, N.Y., a corporation of Delaware
Filed Nov. 20, 1962, Ser. No. 238,919
2 Claims. (Cl. 210—347)

This invention relates to filters and particularly to an improved plate filter of simple construction for ease of assembly and disassembly.

The principal object of the invention is to provide a plate filter of large capacity in which the filtering elements comprise a stack of plates that are readily assembled and disassembled.

Another object of the invention is to provide such a plate filter in which only two mating elements are required to produce a stack of spaced filtering elements.

Still another object of the invention is to provide such a plate filter in which the entire stack of assembled filter plates can be removed as a unit from a housing.

In one aspect of the invention, a housing for the plate filter assembly may comprise an inverted, hollow, dome-like element to the open peripheral edge of which a hollow, cylindrical body portion may be welded. The upper end of the body portion may have welded to it a reinforced hollow, cylindrical member including spaced clamping means for a purpose to be described later. A centrally disposed, axially extending inlet nipple may be rigidly attached to, and pass through the wall of the dome-like element. An inlet manifold may be telescopingly received by the end of said nipple within the housing, and it may include a hollow, tubular element having elongated, axially extending peripheral slots through its side wall, and a solid threaded plug at its upper end extending above the upper end of the housing.

In another aspect of the invention, a plate supporting member may comprise a hub slidingly mounted on the lower end of the inlet manifold with an O-ring seal between its internal cylindrical surface and the outer cylindrical surface of the manifold. The plates supporting member may include a rim that is attached to the hub by spoke means, the rim being adapted to rest on ledge means within the inverted dome-like member. The hub of the plate supporting member may be provided with radial openings that communicate with the slots in the inlet manifold.

In still another aspect of the invention, a bottom spacer member may include a hub portion and a rim portion joined to the hub portion by spokes. The hub portion may fit over a portion of the hub of the plate supporting member and it may include radial through passages that are aligned with those of the hub of the plate supporting member.

In still another aspect of the invention, another spacer member, similar to the bottom spacer member except that it includes an extended cylindrical hub portion of reduced diameter and has no radial through passages therein, may be mounted on the bottom spacer member.

In a still further aspect of the invention, the extended, reduced diameter hub portion forms a bearing for the hub of a filter plate which may comprise a perforated rim portion joined to said hub portion by spaced, perforated, annular sheets which may be welded or otherwise fastened to the hub and rim. Within the space between the annular perforated sheets, a rigid drainage screen may be located to maintain the annular perforated sheets in spaced relation, and filtering media may cover the filter plate exterior. The thickness of the filter plate may be such as to leave exposed a substantial portion of the exended reduced diameter hub portion of the spacer member, which exposed portion forms a bearing for an identical spacer member. A stack of spacer members and filter plates identical to those described may be assembled along the inlet manifold in an alternating arrangement, to a point near the top of the housing.

In still another aspect of the invention, a cover plate may be mounted on top of the stack of spacers and filter plates. It may comprise a disk having a hollow central hub portion adapted slidingly to fit the plug at the top of the inlet manifold, and an O-ring seal may be located between the disk periphery and the inside wall of the reinforced cylinder at the top of the housing.

In still another aspect of the invention, a nut may be threaded onto the plug at the top of the inlet manifold, and it, together with pivotal locking means about the periphery of the housing, releasably holds the cover plate in proper position.

The diameter of the stack of filter plates and spacers provides a clearance between its periphery and the inside of the housing so that as the liquid to be filtered passes upwardly through the inlet manifold, it is fed to the space between the successive filter plates, thence through the filter media on the plates and radially out through the openings in their peripheries, collecting in the bottom of the housing from which the filtrate flows through an outlet leading from the housing.

The above, other objects and novel features of the plate filter will become apparent from the following specification and accompanying drawings which are merely exemplary.

In the drawings:

FIG. 2 is an enlarged sectional view of a portion of FIG. 1;

FIG. 3 is an exploded view of the parts shown in FIG. 2;

FIG. 4 is a plan view of one of the spacer plates of FIG. 1; and

FIG. 5 is a view taken substantially along line 5—5 of FIG. 4.

Figure 1:
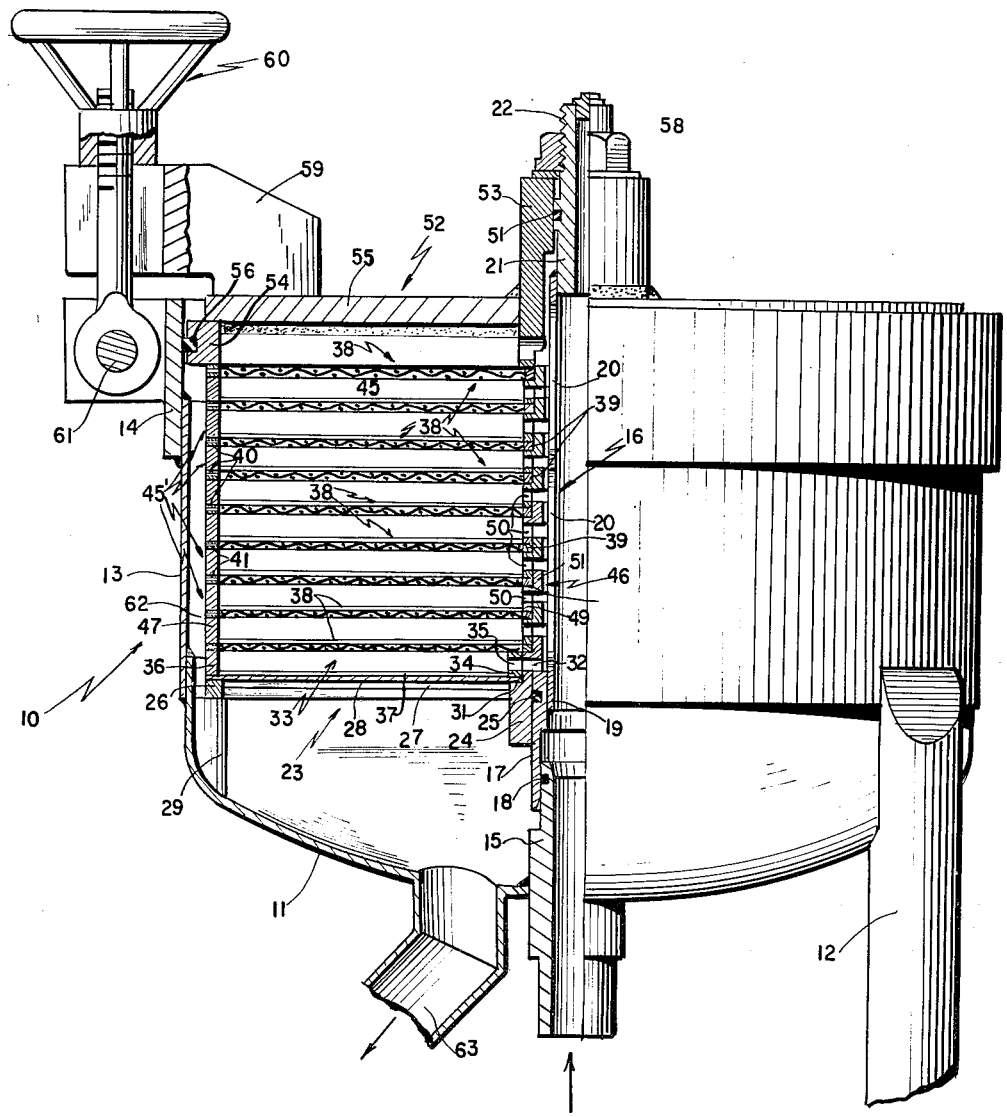
FIGURE 1 is a sectional elevational view of a plate filter to which the principles of the invention have been applied.

Referring to the drawings and particlarly to FIG. 1, the principles of the invention are shown as applied to a plate filter including a housing 10. The housing 10 may comprise a lower portion 11 in the form of an inverted dome to which may be fixed legs 12 (only one being shown) for supporting the housing above a floor or foundation.

A hollow cylindrical body portion 13 may be welded or otherwise fastened to the top of the inverted dome 11, and a reinforcement in the form of a hollow cylinder 14 may be integrally connected to the top of the cylinder 13, thus providing an open top housing.

A hollow nipple 15 may extend through, and be integrally connected to the bottom wall of housing 10 along the longitudinal axis thereof. A hollow cylindrical inlet manifold 16 may comprise a lower sleeve 17 that slidingly telescopes the upper end of nipple 15, and an O ring seal 18 may be located therebetween. An elongated, tubular element 19 may be of less diameter than the sleeve 17 and may be inserted therein and fixed thereto by welding or the like. The tubular element 19 may include elongated, axially extending, peripherally spaced slots 20 through its wall, and the length of element 19 is such that it extends above the top of reinforcing cylinder 14. The top of tubular element 19 is closed by an integral plug 21 having a threaded end 22 for a purpose to be described later.

A plate support 23 may comprise a hub portion 24 that slidingly telescopes the sleeve 17, and an O-ring seal 25 may be located therebetween. The support 23 may also include a rim 26 that is connected to the hub 24 by spokes 27, and a plate 28, welded to the hub and rim, forms an impervious top surface on the support 23. The rim 26 of support 23 may rest on ledge means 29 located within the housing 10. The hub 24 includes an extended portion 30 of less diameter forming a shoulder 31, and radial passages 32 therein communicate with the interior of tubular element 19 through slots 20.

A bottom spacer plate 33 may comprise a hub 34 having radial passages 35 that communicate with passages 32 in hub 24, and it may be connected to an impervious rim 36 by spokes 37. The spacer 33 may rest on the plate support 23, engaging rim 26 at its outer periphery and shoulder 31 on hub 24 of plate support 23.

A filter plate 38 may be mounted on top of the spacer 33. It may conclude a hub portion 39 and a rim 40 having radial passages 41 extending therethrough. Referring to FIG. 3, the rim 40 and hub 39 may be connected by perforated plates 42 and 43 that are welded or otherwise attached to said rim and hub, and held in spaced relation by a drainage screen 44 that is located between plates 42 and 43. Disks of filtering media 45 may be attached to both faces of the filter plate 38. The thickness of the filter plate hub 39 leaves exposed a portion of the reduced diameter portion 30 of hub 24.

Another spacer 45' may be mounted on top of the filter plate 38, and it may include a hub 46 joined to a rim 47 by spokes 48. The hub 46 may include a portion 49 having an internal diameter adapted to slightly engage the exposed extended portion 30 of hub 24, said portion 49 including radial passages 50 and adapted to communicate through slots 20 with the interior of the tubular element 19. It may also include an extended portion 51 of reduced diameter that serves as a support for the hub of another filter plate 38 and the hub of another space 45'. Filter plates 38 and spacers 45' are stacked in alternating ararngement along the tubular element 19 to a desired elevation near the top of the housing 10.

The open top of housing 10 may be closed by a cover plate 52. It may comprise a hub 53 and a rim 54 that are connected by a solid plate 55. The rim 54 may include an O-ring seal 56 between it and the inner surface of cylinder 14, and the hub 53 may include an O-ring seal 57 between it and plug 21. The lower end of hub 53 as well as that of rim 54 rests on the top filter plate 38, and a nut 58 on the threaded poriton of plug 21 acts to assist in forcing cover plate 52 into compressive relation with the stack of filter plates 38 and spacers 45'.

Bifurcated lugs 59 may be spaced about plate 52 for cooperation with handwheel locking means 60 pivotally mounted about cylinder 14 by pins 61.

In operation, slurry to be filtered passes into the housing 10 through inlet manifold 15, 19, thence through slots 20, passages 32 and 50 into chambers formed on each side of all of the filter plates 38, thence through the filtering media 45 thereon, radially outwardly through passages 41, thence downwardly within a space 62 between the stack of filter plates and the housing wall 13, collecting in the inverted dome 11 and finally passing out from housing 10 through outlet pipe 63.

Although the various features of the improved filter have been shown and described in detail to fully disclose one embodiment of the invention, it will be evident that changes may be made in such details and certain features may be used without others without departing from the principles of the invention.

What is claimed is:

1. In a plate filter, a housing having one end open and one end closed; ledge means on the inner periphery of said housing near the closed end thereof; a centrally disposed axially extending nipple mounted within and extending through the closed end of said housing; a tubular element having one end adapted to telescopingly engage the end of said nipple within said housing, provided with a shoulder on the exterior thereof and having radial passages extending through its wall, said tubular element extending to a point above the open end of said housing and having a plug closing its end opposite that engaging said nipple; a plate support comprising a hub portion arranged in said tubular element and adapted to cooperate with said shoulder, and a rim adapted to rest on said ledge means in said housing; alternately arranged filter plates and spacers stacked along said tubular element and supported by said plate support, said filter plates comprising a solid annular impervious hub and a solid rim having radial passages therethrough, a pair of spaced perforated disks positioned within and rigidly attached to said rim and between which is located a drainage screen, said spacers comprising solid hub members having radial passages therethrough connected to solid impervious rim members by spokes; filter media covering said perforated disks and extending to the outer edge of said rim to be clamped between said rim of said filter plate and the rim of said plate support; a cover plate adapted to close the open end of said housing; and means on said plug for compressing said plates and spacers between said cover plate and said shoulder, whereby the cover plate, tubular element, stacked plates and spacers can be removed from and inserted into said housing as a unit.

2. In a plate filter, a housing having one end open and one end closed; ledge means on the inner periphery of said housing near the closed end thereof; a centrally disposed axially extending nipple mounted within and through the closed end of said housing; a tubular element having one end adapted to telescopingly engage the end of said nipple within said housing, provided with a shoulder on the exterior thereof and having radial passages extending through its wall, said tubular element extending to a point above the open end of said housing and having a plug closing its end opposite that engaging said nipple; a plate support comprising a hub portion arranged on said tubular element and adapted to cooperate with said shoulder, and a rim adapted to rest on said ledge means in said housing; alternately arranged filter plates and spacer staked along said tubular element and supported by said plate support, said filter plates comprising a solid annular impervious hub and a solid rim having radial passages therethrough, a pair of spaced perforated disks positioned within and rigidly attached to said rim and between which is located a drainage screen, said spacers comprising solid hub members having radial passages therethrough connected to solid impervious rim members by spokes, said hub members having an extended portion of reduced diameter for supporting an adjacent filter plate and spacer; filter media covering said perforated disks and extending to the outer edge of said rim to be clamped between said rim of said filter plate and the rim of said plate support; a cover plate adapted to close the open end of said housing; and means on said plug for compressing said plates and spacers between said cover plate and said shoulder, whereby the cover plate, tubular element, stacked plates and spacers can be removed from and inserted into said housing as a unit.

References Cited by the Examiner
UNITED STATES PATENTS

| | | | |
|---|---|---|---|
| 2,154,565 | 4/39 | Fife | 210—347 |
| 2,452,486 | 10/48 | O'Meara | 210—344 |
| 2,536,690 | 1/51 | Miller | 210—344 |
| 2,604,994 | 7/52 | Vocelka | 210—346 X |
| 2,624,465 | 1/53 | Kracklauer | 210—344 |
| 2,687,217 | 8/54 | Kracklauer | 210—344 |
| 2,827,174 | 3/58 | Fernandez | 210—488 X |
| 2,970,698 | 2/61 | Darnell | 210—347 |
| 3,065,854 | 11/62 | Winslow | 210—232 X |
| 3,069,014 | 12/62 | Lewis | 210—347 X |

OTHER REFERENCES

Niagara Filters Bulletin NBM-6-56, Copyright 1956, American Machine and Metals, Inc., East Moline, Ill.

REUBEN FRIEDMAN, *Primary Examiner.*

HERBERT L. MARTIN, *Examiner.*

UNITED STATES PATENT OFFICE
CERTIFICATE OF CORRECTION

Patent No. 3,206,034                 September 14, 1965

Kenneth A. Anderson

It is hereby certified that error appears in the above numbered patent requiring correction and that the said Letters Patent should read as corrected below.

Column 3, line 42, for "slightly" read -- slidingly --; line 44, strike out "and"; line 49, for "space" read -- spacer --; line 50, for "ararngement" read -- arrangement --; same column 3, line 60, for "poriton" read -- portion --; column 4, line 20, for "in" read -- on --; line 44, after "and" insert -- extending --; line 57, for "spacer staked" read -- spacers stacked --.

Signed and sealed this 15th day of March 1966.

(SEAL)
Attest:

ERNEST W. SWIDER                 EDWARD J. BRENNER
Attesting Officer                      Commissioner of Patents